United States Patent
Gaddam et al.

(10) Patent No.: US 10,319,166 B2
(45) Date of Patent: Jun. 11, 2019

(54) VEHICLE-BASED IDENTIFICATION AND ACCESS

(71) Applicant: VISA INTERNATIONAL SERVICE ASSOCIATION, San Francisco, CA (US)

(72) Inventors: Sivanarayana Gaddam, Santa Clara, CA (US); Gaurav Kohli, Foster City, CA (US); Gyan Prakash, Foster City, CA (US)

(73) Assignee: Visa International Service Assocation, San Francisco, CA (US)

( * ) Notice: Subject to any disclaimer, the term of this patent is extended or adjusted under 35 U.S.C. 154(b) by 0 days.

(21) Appl. No.: 15/583,808

(22) Filed: May 1, 2017

(65) Prior Publication Data

US 2017/0323505 A1  Nov. 9, 2017

Related U.S. Application Data

(60) Provisional application No. 62/332,429, filed on May 5, 2016.

(51) Int. Cl.
| | | |
|---|---|---|
| G07C 9/00 | (2006.01) | |
| G07B 15/00 | (2011.01) | |
| G06Q 30/06 | (2012.01) | |
| H04L 29/06 | (2006.01) | |

(52) U.S. Cl.
CPC ..... *G07C 9/00896* (2013.01); *G06Q 30/0635* (2013.01); *G07B 15/00* (2013.01); *G07C 9/00309* (2013.01); *H04L 63/08* (2013.01); G07C 2009/00928 (2013.01)

(58) Field of Classification Search
CPC ...... G07B 15/00; G07C 9/00; G07C 9/00896; G07C 9/00309; G07C 2009/00928; H04L 29/06; H04L 63/08; G06Q 20/38; G06Q 20/3821; G06Q 30/06; G06Q 30/0635
See application file for complete search history.

(56) References Cited

U.S. PATENT DOCUMENTS

| | | | |
|---|---|---|---|
| 2001/0034760 A1 | 10/2001 | Paton | |
| 2002/0007291 A1* | 1/2002 | Miller | G06Q 10/02 705/5 |
| 2002/0180582 A1* | 12/2002 | Nielsen | G07C 9/00103 340/5.6 |
| 2003/0127513 A1 | 7/2003 | Devries | |
| 2008/0208680 A1 | 8/2008 | Cho | |
| 2011/0136429 A1 | 6/2011 | Ames | |
| 2011/0208568 A1 | 8/2011 | Deitiker | |
| 2013/0085928 A1 | 4/2013 | McKinney | |
| 2013/0124855 A1* | 5/2013 | Varadarajan | G06Q 20/3276 713/155 |
| 2013/0329888 A1 | 12/2013 | Alrabady | |
| 2015/0058224 A1 | 2/2015 | Gaddam | |

(Continued)

*Primary Examiner* — Brian Wilson
(74) *Attorney, Agent, or Firm* — Kilpatrick Townsend & Stockton LLP

(57) ABSTRACT

A method for conducting an interaction using a vehicle is disclosed. A vehicle can be identified based on one or more vehicle characteristics, including a license plate number, a make, a model, and a color. A user credential can be identified based on the vehicle and used for an interaction. Additionally, user contact information can be identified based on the vehicle and the user can be contacted to approve the interaction.

21 Claims, 8 Drawing Sheets

(56) References Cited

U.S. PATENT DOCUMENTS

2015/0242855 A1* 8/2015 Vilnai ................... B67D 7/34
                                                        705/44
2016/0328898 A1* 11/2016 Robinson ............ G07C 9/00111

* cited by examiner

VEHICLE-BASED IDENTIFICATION AND ACCESS

CROSS REFERENCE TO RELATED APPLICATIONS

This application is a non-provisional application of and claims the benefit of the filing date of U.S. Provisional Application No. 62/332,429, filed on May 5, 2016, which is herein incorporated by reference in its entirety for all purposes.

BACKGROUND

There are a number of scenarios where an individual interacts with an access terminal or a service person while simultaneously operating a vehicle. For example, while driving a car, an individual may attempt to enter an area that requires security clearance, gain entrance to a parking garage, pick up medications, cross a geographic border, purchase good at a drive-through restaurant, pay for a toll, etc.

These interactions typically cause delays and inconvenience. Handing over an access card at a security station requires the driver to stop their car (causing delays) and reach out of their car window (causing discomfort). Additionally, a human operator has the opportunity to skim a magnetic stripe card or otherwise copy access credentials.

U.S. Patent Publication No. 2011/0208568 to Deitker et al. provides improvements to the toll payment scenario. Deitker et al. describes a system for identifying a vehicle using RFID (radio frequency identification) or by reading the license plate number. When the vehicle passes through a toll area, a toll facility identifies the vehicle. The next day, the toll facility sends a payment request to a financial network. The financial network looks up a bank account linked with the vehicle, and then causes the toll payment to be taken from the bank account and sent to the toll facility. This streamlines the process for passing through a toll area, as the driver does not have to stop, physically hand anything to an operator, or have a special prepaid account for the toll service.

However, the system in Deitker et al. is specifically designed for the toll plaza scenario and it is not suitable for use with other types of vehicle-based transactions. For example, in Deitiker et al., the transaction is not authorized until after the vehicle has passed the toll station, and transactions are processed in batches. Thus, the system in Deitiker et al. does not work for other types of resource providers that process transactions individually such that the transaction can be authorized before granting access or releasing goods (e.g., military base security stations, gas stations, and drive-through restaurants).

Embodiments of the invention address these and other problems individually and collectively.

SUMMARY

Embodiments of the invention are directed to improving vehicle-based transactions. Embodiments expand vehicle-based transactions to additional contexts, such as gaining access to secure areas, gaining access to a parking facility, and enabling additional forms of purchases (e.g., purchasing goods or services in a drive-through). New vehicle-based transactions are achieved by making system changes and introducing several new functions.

For example, embodiments allow a user credential (e.g., an access credential or payment credential) to be identified based on a vehicle, and then transmitted to a resource provider (e.g., an access terminal or merchant). As a result, the resource provider can use the credential to obtain transaction authorizing. Additionally, the resource provider can gain authorization before providing access, goods, or services. This allows vehicle-based transaction to be used in scenarios where it is important to authorize a transaction before granting access, such as a scenario where a user wants to enter a military base (e.g., or another security-privileged area), or a scenario where a user is conducting an expensive purchase (e.g., purchasing an unknown amount of gasoline).

Embodiments also allow a vehicle to be identified based on one or more qualities. A vehicle can be identified based on an RFID signal, a license plate number, a vehicle make (e.g., a manufacturer or brand) and model, a color, a shape, and/or any other suitable vehicle characteristic. These extra details provide alternative options for vehicle identification and can provide redundancy when identifying a vehicle, making the identification more reliable. Additionally, extra details make it easier to differentiate between different vehicles.

Additionally, embodiments also allow transactions of different values to take place. For example, instead of having a financial network process toll payments of with certain pre-defined amounts on behalf of a toll facility, a merchant can specify a transaction of any suitable amount (e.g., based on the items being purchased), obtain a user credential, and process the transaction with the user credential.

In some embodiments, a user can place an order via a mobile device. For example, a user can select one or more goods or services for purchase, and the mobile device can transmit the order to a server computer. The server computer can then send information about the selected items to the merchant along with a user's payment credential. As a result, the user can conduct a transaction in a drive-through area without having to hand over a payment device or open a window to speak to a service person.

Some embodiments enable personalization of a mobile application based on a vehicle's location. For example, a resource provider can specify a format for a graphical user interface, a set of information to provide (e.g., a menu), and any other suitable settings for a mobile application. When the user drives the vehicle to the resource provider location, the resource provider's mobile application settings can be pushed to a mobile application on the user's mobile device. As a result, the user can place an order through a merchant-customized application. Embodiments allow a single flexible mobile application to be used with multiple different merchant formats based on the vehicle's current location.

One embodiment of the invention is directed to a method. The method comprises receiving vehicle information associated with a vehicle when the vehicle is approaching an access device. The method also includes determining a vehicle record associated with the vehicle based on the received vehicle information, and identifying a credential associated with the vehicle based on the vehicle record. The method further comprises providing the credential to the access device.

Another embodiment of the invention is directed to a server computer configured to perform the above-described method.

Another embodiment of the invention is directed to a method comprising receiving vehicle information associated with a vehicle as the vehicle is approaching an access device. The method further comprises determining a vehicle record associated with the vehicle based on the received vehicle information and identifying a mobile device associated with the vehicle based on the vehicle record. The method also includes receiving a transaction request from the mobile device, and sending an authorization request message to an authorizing entity computer on behalf of the access device. The authorizing entity sends an authorization response message to the access device indicating that the transaction is authorized.

Another embodiment of the invention is directed to a server computer configured to perform the above-described method.

Further details regarding embodiments of the invention can be found in the Detailed Description and the Figures.

DETAILED DESCRIPTION

Figure 1:
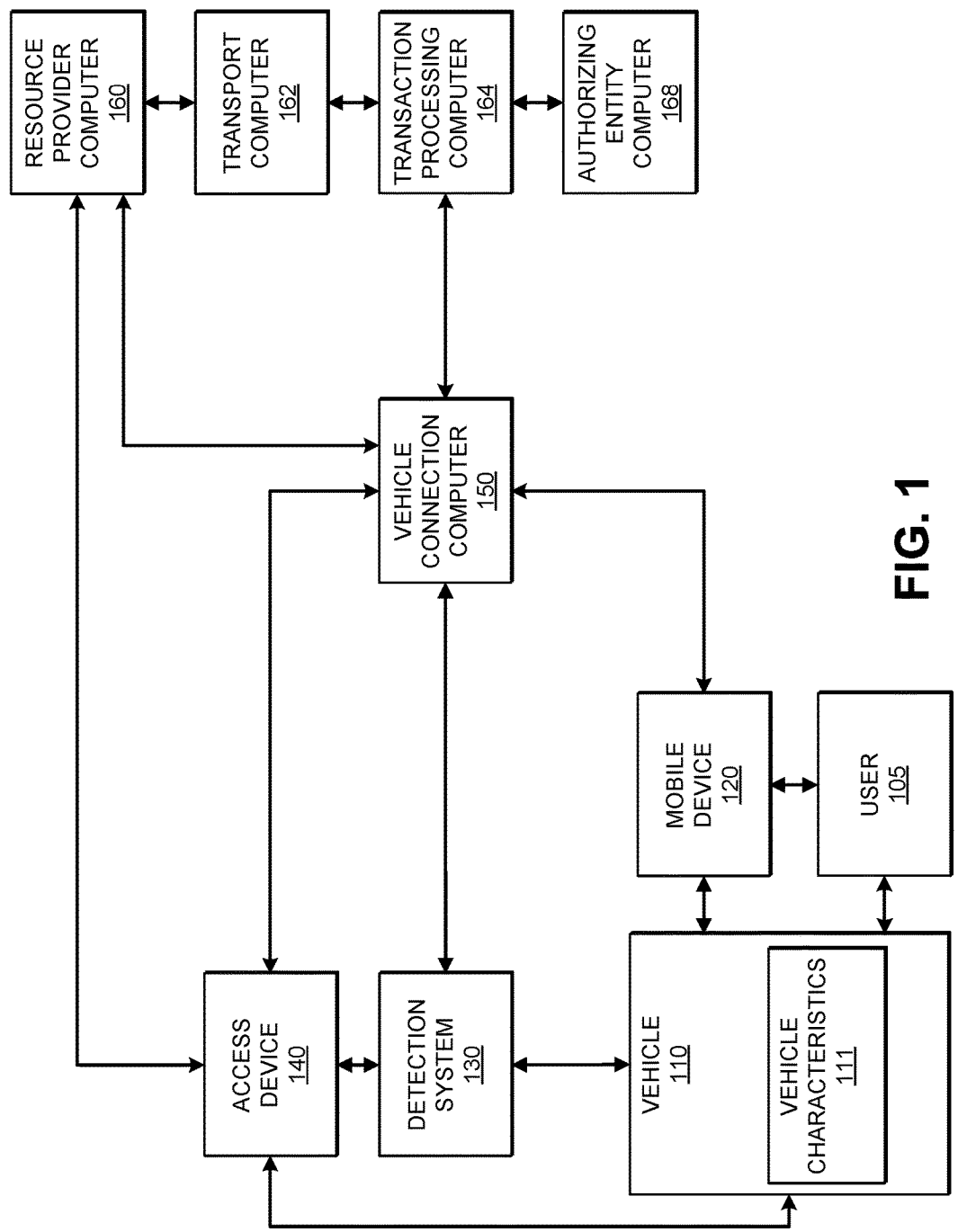
FIG. 1 shows a block diagram of a system according to an embodiment of the invention.

Embodiments of the present invention are directed to improving vehicle-based transactions. Embodiments expand vehicle-based transactions to additional contexts, such as gaining access to secure areas, gaining access to a parking facility, and enabling additional forms of purchases (e.g., purchasing goods or services in a drive-through). New vehicle-based transactions are achieved by introducing several new functions.

For example, embodiments allow a user credential (e.g., an access credential or payment credential) to be identified based on a vehicle, and then transmitted to a resource provider (e.g., an access terminal or merchant). The resource provider can gain authorization before providing access, goods, or services. Embodiments further allow a vehicle to be identified based on one or more qualities, such an RFID signal, a license plate number, a vehicle make and model, a color, a shape, and/or any other suitable vehicle characteristic. Additionally, embodiments also allow a user to place an order via mobile device, and the user can order via a mobile application that is configured with resource provider-specific settings and information.

The following description will primarily describe vehicle-based transactions for accessing a restricted physical space (e.g., a parking garage or a secure area) and vehicle-based transactions for making a purchase in a drive-through (e.g., at a fast food restaurant). However, embodiments of the invention apply to any suitable scenario where a vehicle can be used to make a purchase, to gain access, or conduct any other suitable type of transaction. For example, embodiments can also be applied to crossing a geographic border with a vehicle (e.g., a user's passport, driver's license, visa, or other identification credentials can be obtained based on a vehicle and sent to a border patrol station), gaining entrance to an event (e.g., a user's event tickets can be associated with a vehicle), or obtaining medication (e.g., a user's health insurance information can be associated with a vehicle).

Prior to discussing specific embodiments of the invention, some terms may be described in detail.

A "vehicle" may include an object used for transporting people or goods. Example vehicles include automobiles, such as cars, trucks, busses, motorcycles, and mopeds. Vehicles can also include high-capacity transporters such as trains and airplanes, over-water transporters such as boats, and manual transporters such as bicycles.

"Vehicle characteristics" may include qualities and features of a vehicle. For example, vehicle characteristics can be physical details such as a shape, a color, irregularities due to damage, a rim size, a paint pattern, etc. Vehicle characteristics further include a vehicle identifier such as a VIN (Vehicle Identification Number), as well as a classification associated with a vehicle, such as a make, model, and a year of manufacturer. Vehicle characteristics can also include identifying markings and tags such as a license plate, displayed information (e.g., a make, model, a logo, or other details), and an electronic identifier (e.g., an RFID chip with an encoded VIN).

"Vehicle information" may include data associated with a vehicle. In some embodiments, vehicle information can be obtained using detection equipment. For example, vehicle information can include a photo displaying some or all of a vehicle, a weight (e.g., measured from a scale), and a 3D digital model (e.g., obtained using a laser scanner). Vehicle information can also be electronic data transmitted from a vehicle (e.g., a VIN from an RFID circuit).

A "credential" may be any suitable information that serves as reliable evidence of worth, ownership, identity, or authority. A credential may be a string of numbers, letters, or any other suitable characters that may be present or contained in any object or document that can serve as confirmation. Examples of credentials include identification credentials (e.g., a driver's license number), payment credentials (e.g., a primary account number), event credentials (e.g., a ticket barcode), and access credentials (e.g., a username and password, an access code, a security clearance authorization), etc.

"Payment credentials" may include any suitable credential that can be used to conduct a payment transaction. Such information may be directly related to an account or may be derived from information related to the account (e.g., a payment account and/or a payment device associated with the account). Examples of payment credentials may include a PAN (primary account number or "account number"), user name, expiration date, and verification values such as CVV (card verification value), dCVV (dynamic card verification value), CVV2 (card verification value 2), CVC3 card verification values, etc. An example of a PAN is a 16-digit number, such as "4147 0900 0000 1234."

A "token" may be a substitute value for a credential. A token may be a string of numbers, letters, or any other suitable characters. Examples of tokens include payment tokens, access tokens, personal identification tokens, etc.

A "payment token" may include an identifier for a payment account that is a substitute for an account identifier, such as a primary account number (PAN). For example, a token may include a series of alphanumeric characters that may be used as a substitute for an original account identifier.

For example, a token "4900 0000 0000 0001" may be used in place of a PAN "4147 0900 0000 1234." In some embodiments, a token may be "format preserving" and may have a numeric format that conforms to the account identifiers used in existing transaction processing networks (e.g., ISO 8583 financial transaction message format). In some embodiments, a token may be used in place of a PAN to initiate, authorize, settle or resolve a payment transaction or represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token.

An "access device" may be any suitable device that provides access to a remote system. An access device may also be used for communicating with a resource provider computer, a transaction processing computer, an authentication computer, or any other suitable system. An access device may generally be located in any suitable location, such as at the location of a resource provider. An access device may be in any suitable form. Some examples of access devices include POS or point of sale devices (e.g., POS terminals), cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, and the like. An access device may use any suitable contact or contactless mode of operation to send or receive data from, or associated with, a user mobile device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a payment device and/or mobile device.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers.

FIG. 1 shows a system 100 comprising a number of components. The system 100 comprises a vehicle 110 and a mobile device 120 operated by a user 105. The system 100 further comprises a detection system 130, a vehicle connection computer 150, an access device 140, a resource provider computer 160, a transport computer 162, a transaction processing computer 164, and an authorizing entity computer 168, each of which may be embodied by one or more computers, and each of which may all be in operative communication with each other through any suitable communication channel or communications network. Suitable communications networks may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like.

Messages between the computers, networks, and devices may be transmitted using a secure communications protocols such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like.

The vehicle 110 can include one or more vehicle characteristics 111 that distinguish the vehicle 110 from other vehicles. In some embodiments, the vehicle 110 can include one or more vehicle characteristics 111 (or a combination of vehicle characteristics 111) that uniquely identify the vehicle 110. A set of vehicle characteristics 111 that can be used to identify the vehicle 110 can be referred to as a "vehicle fingerprint."

The mobile device 120 can include a transaction interface. For example, the user 105 can use the mobile device 120 to initiate transactions and/or provide transaction details (e.g., select items for purchase). The user 105 can also consent to a transaction and select an account for a transaction via the mobile device 120.

Figure 2:
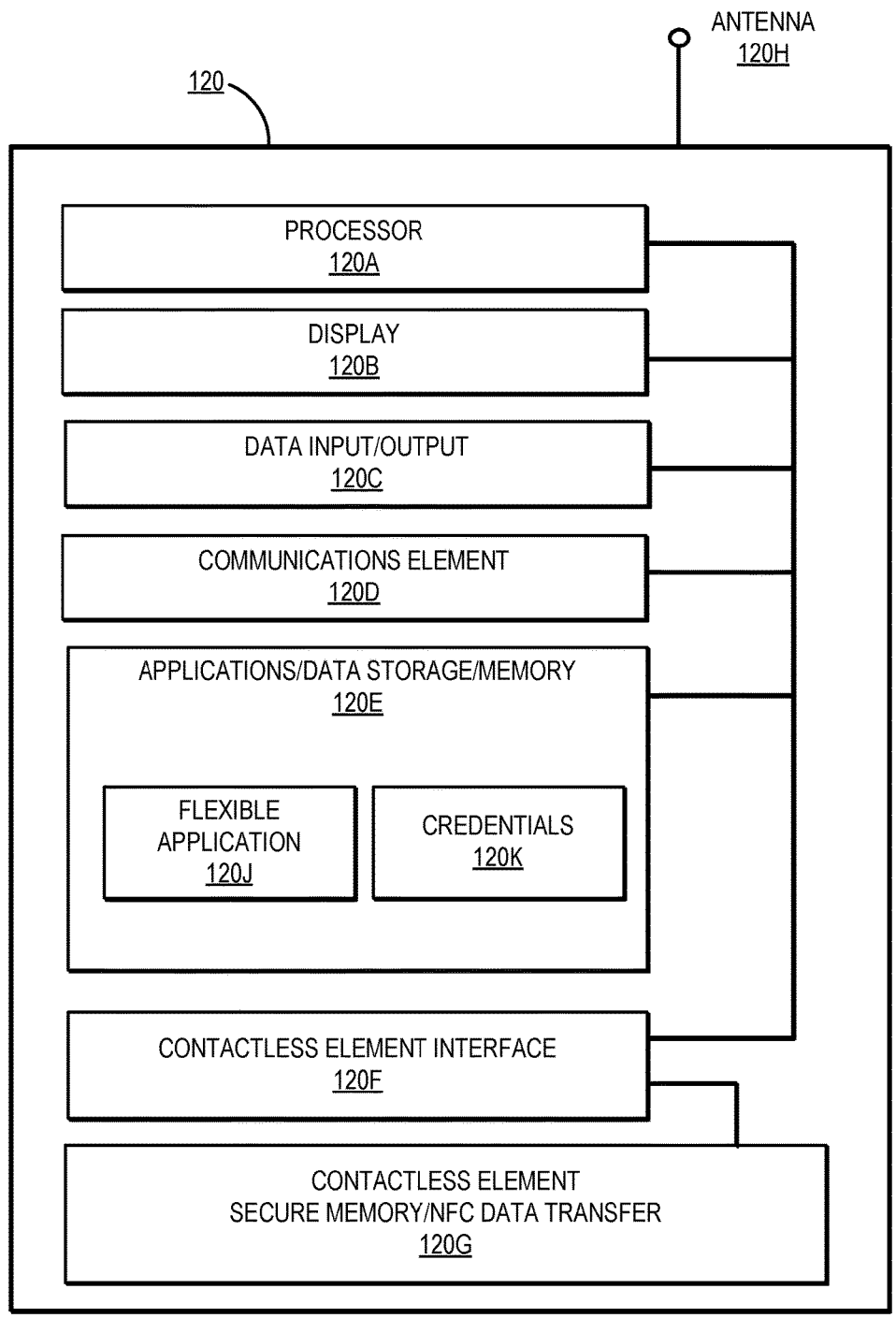
FIG. 2 shows a block diagram of an exemplary mobile device according to an embodiment of the invention.

An example of the mobile device 120, according to some embodiments of the invention, is shown in FIG. 2. The mobile device 120 may include circuitry that is used to enable certain device functions, such as telephony. The functional elements responsible for enabling those functions may include a processor 120A that can execute instructions that implement the functions and operations of the device. The processor 120A may access memory (or another suitable data storage region or element) to retrieve instructions or data used in executing the instructions, such as provisioning scripts and mobile applications. The data input/output elements 120C, such as a keyboard or touchscreen, may be used to enable a user 105 to operate the mobile device 120 and input data (e.g., user authentication data). The data input/output elements 120C may also be configured to output data (via a speaker, for example). The display 120B may also be used to output data to a user 105. The communications element 120D may be used to enable data transfer between mobile device 120 and a wired or wireless network (via antenna 120H, for example) to assist in connectivity to the Internet or other network, and enabling data transfer functions. The mobile device 120 may also include contactless element interface 120F to enable data transfer between contactless element 120G and other elements of the device, where contactless element 120G may include a secure memory and a near field communications data transfer element (or another form of short range communications technology). As noted, a cellular phone or similar device is an example of a mobile device 120 that may be used in accordance with embodiments of the present invention. However, other forms or types of devices may be used without departing from the underlying concepts of the invention. For example, the mobile device 120 may alternatively be in the form of a payment card, a key fob, a tablet computer, a wearable device, a vehicle such as a car, etc.

The memory 120E may comprise a flexible application 120J, credentials 120K, and any other suitable module or data. The mobile device 120 may have any number of mobile applications installed or stored on the memory 120E and is not limited to that shown in FIG. 2.

The flexible application 120J can, in conjunction with the processor 120A, provide a user interface for the user 105 to provide input and initiate, facilitate, and manage transactions using the mobile device 120. In some embodiments, the flexible application 120J can be a resource provider application associated with a specific resource provider. In other embodiments, the flexible application 120J can be modified based on the location of the mobile device 120 and/or vehicle 110. For example, the mobile device 120 can receive application settings from the vehicle connection computer 150, and the settings can be applied to the flexible application 120J. The settings can include information associated with a resource provider (e.g., a title, a menu, etc.) as well as a certain display format for a user interface. As a result, the flexible application 120J can take on qualities of different resource provider applications depending on the location.

In one example, the vehicle 110 arrives at a fast food restaurant, and the flexible application 120J takes on settings associated with that restaurant. As a result, the flexible application 120J looks, feels, and functions as if it were a restaurant-specific application. The flexible application 120J can display a logo or name associated with the restaurant, a color scheme associated with the restaurant, a menu with selectable items associated with the restaurant, etc.

In one example, the vehicle 110 arrives at a Navy base (e.g., or any other suitable branch of the military) entrance with a guard station, and the flexible application 120J takes on settings associated with the Navy. As a result, the flexible application 120J looks, feels, and functions as if it were a Navy-specific application. The flexible application 120J can display a Navy logo or motto, a Navy color scheme, a set of selectable rank options for user 105 (e.g., select whether user 105 is an officer or enlisted), a set of selectable destination options to indicate to which part of the base user 105 is going (e.g., barracks, firing range, supply area, etc.), a set of selectable purpose options to indicate what the user 105 will be doing (e.g., reporting for duty, heading to barracks, etc.), and any other suitable information for recognizing the legitimacy of the Navy-customized application or for providing entrance-related information.

The credentials 120K can include any suitable type of credentials, such as payment credentials or access credentials. The credentials 120K can also include user identification information, such as a name, an address, a phone number, etc. In some embodiments, the mobile device 120 can provide the credentials 120K to the vehicle connection computer 150 for a transaction.

In some embodiments, the mobile device 120 can be incorporated as a part of the vehicle 110. For example, the mobile device 120 hardware and functionality described herein can be integrated with the vehicle 110 hardware. The display 120B can be integrated with a vehicle 110 display (e.g., a dashboard screen), the processor 120A can be integrated with an existing vehicle 110 processor, the antenna 120H can be built into the vehicle 110 or combined with an existing vehicle 110 antenna, etc.

Referring back to FIG. 1, the detection system 130 can detect the presence of the vehicle 110, as well as detect vehicle information associated with the vehicle 110. The detection system 130 can also send vehicle information to the vehicle connection computer 150 and/or the access device 140.

Figure 3:
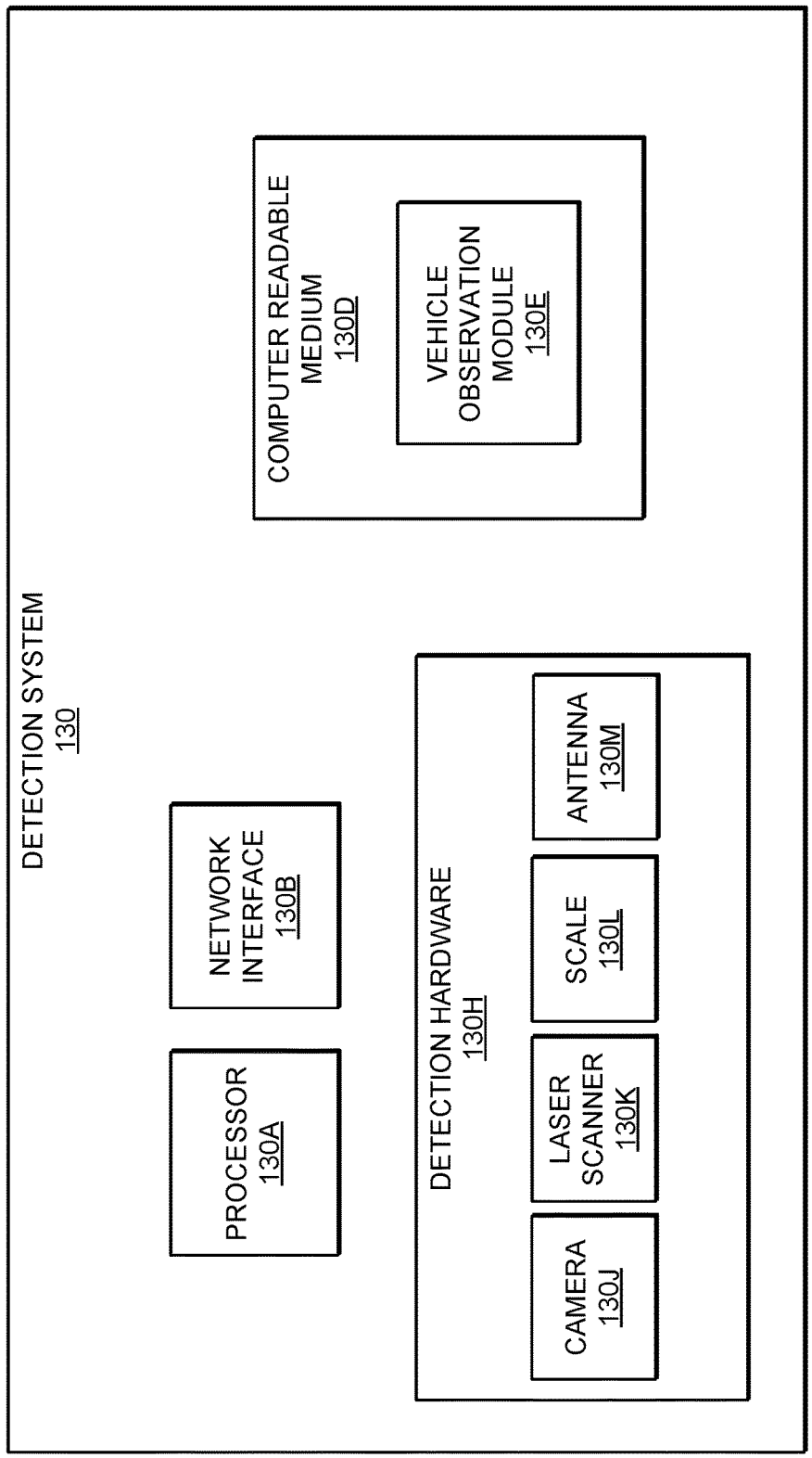
FIG. 3 shows a block diagram of a detection system according to an embodiment of the invention.

An example of the detection system 130, according to some embodiments of the invention, is shown in FIG. 3. The detection system 130 comprises a processor 130A, a network interface 130B, detection hardware 130H, and a computer readable medium 130D.

The detection hardware 130H can include one more components that are capable of obtaining vehicle information. For example, detection hardware 130H can include a camera 130J for capturing images of a vehicle 110, a laser scanner 130K for scanning the shape of a vehicle 110, a scale 110L for weighing a vehicle 110, an antenna 130M for communicating wirelessly (e.g., using radio frequencies) with a vehicle 110, and/or any other suitable device for obtaining vehicle information.

The computer readable medium 130D may comprise a vehicle observation module 130E, and any other suitable software module. The vehicle observation module 130E may comprise code that causes the processor 130A to control one or more detection hardware 130H components to obtain vehicle information. For example, the a vehicle observation module 130E may contain logic that causes the processor 130A to capture an image of a vehicle 110 using a camera 130J.

In some embodiments, the detection system 130 can obtain vehicle information at different times or locations. For example the detection system 130 can obtain vehicle information when the vehicle 110 is within a predetermined distance of a service window, such as 5 feet, 10 feet, 20 feet, or 50 feet, when the vehicle 110 is within a drive-through lane, and/or when the vehicle 110 is otherwise moving toward a transaction area. Additionally, the detection system 130 can obtain vehicle information when the vehicle 110 is in a location where it can be observed by the detection system 130, such as when the vehicle 110 in on a scale 130L, within a camera 130J or laser scanner 130K field of view, etc. Any of these scenarios can indicate that a vehicle 110 is approaching an access device in order to conduct a transaction.

Referring back to FIG. 1, the access device 140 can be a resource provider's tool for initiating transaction processing. The access device 140 can be in communication with the detection system 130, the vehicle connection computer 150, and/or the mobile device 120. For example, the access device 140 may receive transaction details, payment information, and/or an authorization response from the vehicle connection computer 150.

The resource provider computer 160 may be associated with a resource provider, which may be an entity that can provide a resource such as goods, services, information, and/or access. Examples of a resource provider include merchants, access devices, secure data access points, etc. A merchant may typically be an entity that engages in transactions and can sell goods or services, or provide access to goods or services.

The vehicle connection computer 150 can provide services that enable in-vehicle transactions. For example, in some embodiments, the vehicle connection computer 150 can determine the identity of a vehicle 110 based on vehicle information received from the detection system 130, and provide credentials associated with the vehicle 110 to the access device 140.

Figure 4:
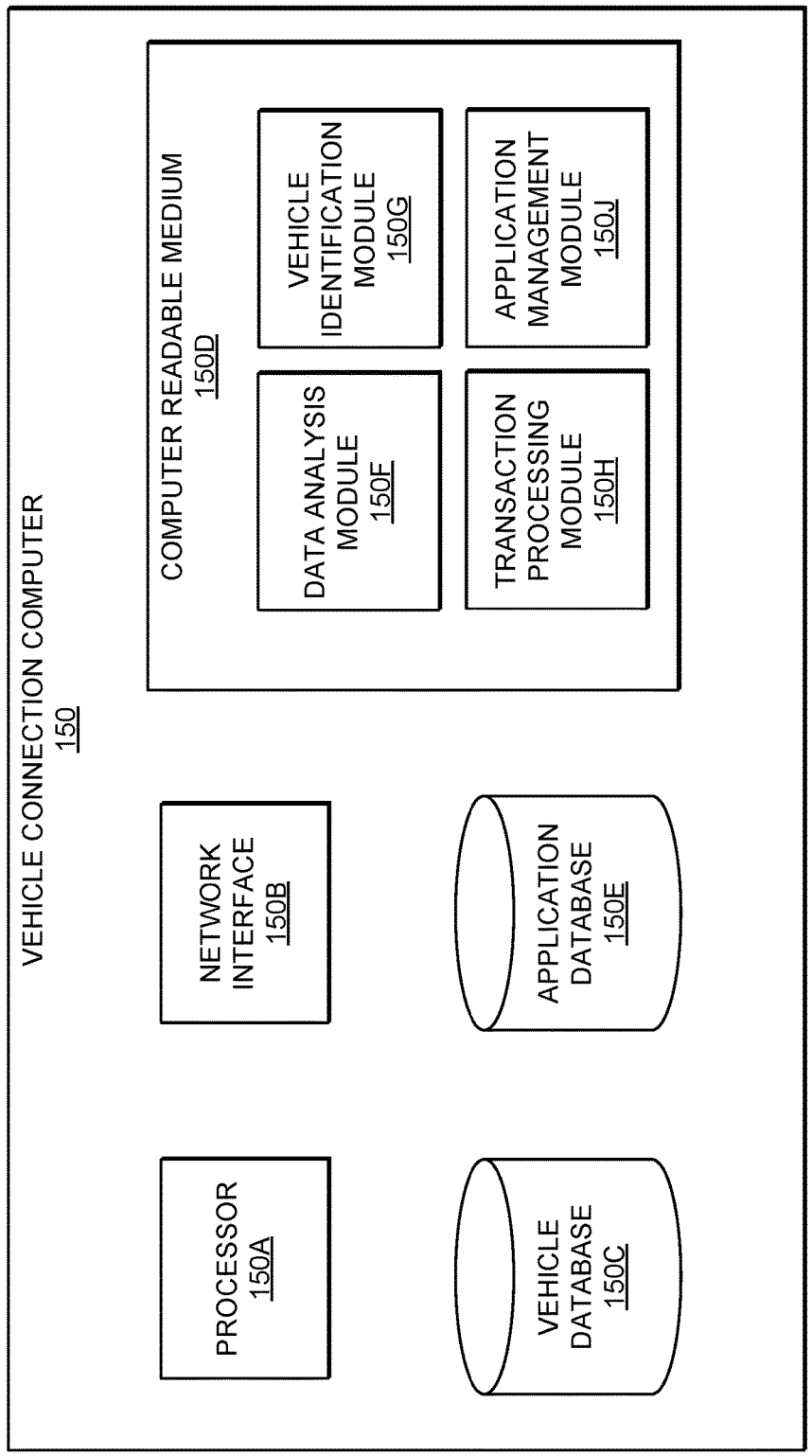
FIG. 4 shows a block diagram of a vehicle connection computer according to an embodiment of the invention.

An example of the vehicle connection computer 150, according to some embodiments of the invention, is shown in FIG. 4. The vehicle connection computer 150 comprises a processor 150A, a network interface 150B, a vehicle database 150C, an application database 150E, and a computer readable medium 150D.

The vehicle database 150C can include information about one or more vehicle records. A vehicle record can include information associated with a specific vehicle 110, such as one or more vehicle characteristics 111. A vehicle record can also include information about a mobile device 120 associated with the vehicle 110, such as a phone number or device identifier. Additionally, a vehicle record can include account credentials associated with the vehicle 110, such as access credentials or payment credentials. In some embodiments, credentials stored in a vehicle record can be tokens (e.g., a payment token or an access token).

The application database 150E can include information about application settings and configurations. For example, a resource provider may have configured specific settings and information for a mobile application. These settings can be associated with the resource provider in a resource provider record in the application database 150E. The resource provider record can be identified based on resource provider information such as a merchant name and/or location. As a result, the resource provider's application settings can be obtained and utilized for the mobile device 120 when the vehicle 110 is at a resource provider location.

The computer readable medium 150D may comprise a data analysis module 150F, a vehicle identification module 150G, a transaction processing module 150H, an application management module 150J, and any other suitable software module. The computer readable medium 150D may also comprise code, executable by the processor 150A for implementing a method comprising receiving vehicle information associated with a vehicle, wherein the vehicle is approaching an access device; determining a vehicle record associated with the vehicle based on the received vehicle information; identifying a credential associated with the vehicle based on the vehicle record; and providing the credential to the access device.

The data analysis module 150F can comprise code that causes the processor 150A to determine vehicle characteristics 111 based on analyzing vehicle information. For example, the data analysis module 150F can contain logic that causes the processor 150A to identify vehicle characteristics 111 from an image of a vehicle, such as a license plate number (e.g., via text recognition software), a color (e.g., via color recognition software), a shape (e.g., via shape recognition software), a make, a model (e.g., by identifying a model name or logo displayed in the image), markings from previous damage, a paint pattern, a rim size, and any other suitable details. The data analysis module 150F can also include instructions for determining the shape and size of a vehicle based on a laser scan. For example, the data analysis module 150F can, in conjunction with the processor 150A, create a 3D digital model of a vehicle 110 based on raw laser scan data. In some embodiments, a make, model, and/or year of manufacture can be determined by comparing a determined shape with a database of vehicle shapes and associated vehicle types.

In some embodiments, a make (e.g. the vehicle manufacturer) can be identified by recognizing a logo (or other displayed information) in an image. Then, the model can be determined by comparing the vehicle shape (or 3D digital model) with a set of shapes (and corresponding models) associated with the make.

The vehicle identification module 150G may comprise code that causes the processor 150A to identify a vehicle based on vehicle characteristics. For example, the vehicle identification module 150G may contain logic that causes the processor 150A to identify a vehicle record based on vehicle characteristics determined using the data analysis module 150F. In some embodiments, a vehicle record can be uniquely identified based on a certain combination of vehicle characteristics (e.g., a make, model, color, and damage markings), or based on a single unique vehicle characteristic (e.g., a license plate number or a VIN).

In some embodiments, a vehicle record can include an image of the vehicle 110 taken at an earlier time. The vehicle identification module 150G may comprise code that causes the processor 150A to compare a newly obtained image (e.g., received with the vehicle information), and identify a vehicle record with an image that matches or is similar. This can include comparing shape, style, color, size, markings, and any other suitable features of a first vehicle in a first image to a set of second vehicles in a set of second images. In some embodiments, multiple images can be taken from different perspectives (e.g., a front view, a side view, and a top view) and compared with corresponding database images of various vehicles from similar perspectives.

In some embodiments, a user's credentials or other payment account information, as well as a user's mobile device 120 information, are stored in a vehicle record. Accordingly, a user's credentials and phone number can be identified based on vehicle characteristics (e.g., by determining the correct vehicle record).

The transaction processing module 150H can comprise code that causes the processor 150A to process transactions. For example, the transaction processing module 150H can include instructions for communicating with the mobile device 120 in order to obtain a user's consent to a transaction. In some embodiments, transaction processing module 150H can, in conjunction with the processor 150A, receive a request to process a transaction from the access device 140, and provide credentials and/or an authorization response message to the access device 140.

The application management module 150J may comprise code that causes the processor 150A to determine application settings and provide the application settings to a mobile device 120. For example, the application management module 150J may contain logic that causes the processor 150A to identify a resource provider record based on resource provider information associated with a current transaction. Then, application configurations can be retrieved from the resource provider record and pushed to the mobile device 120.

In some embodiments, some of the functionality described herein for the vehicle connection computer 150 can instead be performed by the detection system 130. For example, the detection system 130 can instead include the vehicle database 150C, the data analysis module 150F, and/or the vehicle identification module 150G. In that case, instead of just obtaining vehicle information and providing it to the vehicle connection computer 150, the detection system 130 can determine a vehicle 110 and/or a vehicle record and provide that information to the vehicle connection computer.

In some embodiments, the vehicle connection computer 150 can be integrated with the transaction processing computer 164, such that they are one entity.

Referring back to FIG. 1, the transport computer 162 may be associated with an acquirer, which may typically be a business entity (e.g., a commercial bank) that has a business relationship with a particular merchant or other entity. Some entities can perform both issuer and acquirer functions. Some embodiments may encompass such single entity issuer-acquirers. The transport computer 162 may be more specifically referred to as an acquirer computer.

The transaction processing computer 164 may be disposed between the transport computer 162 and the authorizing entity computer 168. The transaction processing computer 164 may include data processing subsystems, networks, and operations used to support and deliver authorization services, exception file services, and clearing and settlement services. For example, the transaction processing computer 164 may comprise a server coupled to a network interface (e.g., by an external communication interface), and databases of information. The transaction processing computer 164 may be representative of a transaction processing network. An exemplary transaction processing network may include VisaNet™. Transaction processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The transaction processing computer 164 may use any suitable wired or wireless network, including the Internet.

The authorizing entity computer 168 may be associated with an authorizing entity, which may be an entity that authorizes a request. An example of an authorizing entity may be an issuer, which may typically refer to a business entity (e.g., a bank) that maintains an account for a user 105. An issuer may also issue and manage a payment account associated with the user 105.

The transaction processing computer 164, the transport computer 162, and the authorizing entity computer 168 may operate suitable routing tables to route authorization request messages and/or authorization response messages using payment credentials, merchant identifiers, or other account identifiers.

As mentioned above, embodiments of the invention can be applied to any suitable type of transaction. For example, a user 105 may drive the vehicle 110 into a certain area to make a purchase, such as a purchase for food in a drive-through, or to pay for a toll on a highway. Embodiments also allow the vehicle 110 to be used for accessing a restricted area, such as a parking garage or an area that requires a security clearance to access. Embodiments further allow a user 105 to cross a controlled geographic border based on the vehicle 110.

Figure 5:
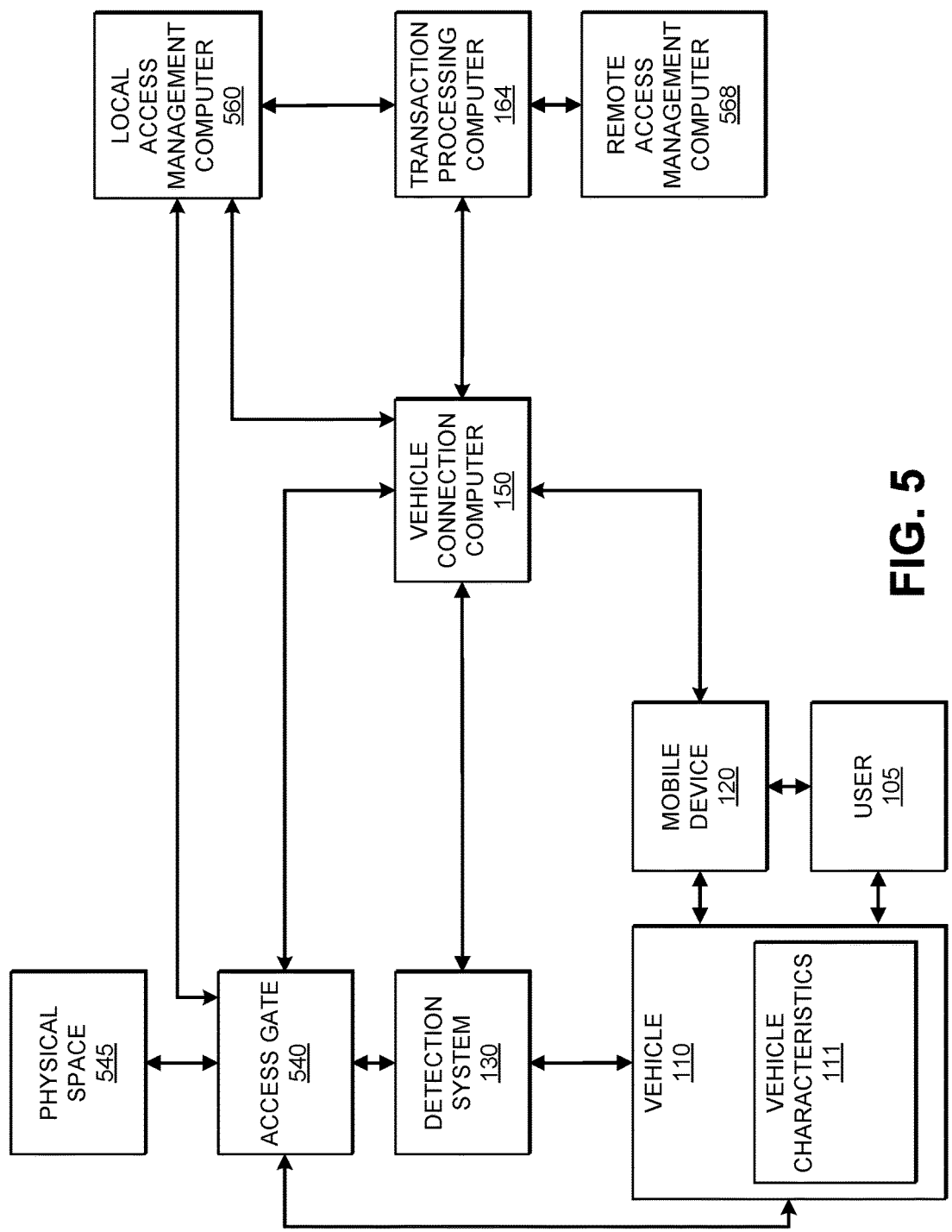
FIG. 5 shows an example system for accessing a physical space, according to an embodiment of the invention.

The components in FIG. 1 can take more a more specific form when used for a specific application. For example, FIG. 5 shows a system 500 that is tailored for processing access transactions in order to grant physical access to a physical space.

In the system 500, the access device 140 takes the form of an access gate 540. The access gate 540 can prevent unauthorized access to a physical space 545. The access gate 540 can also allow access to the physical space 545 for an authorized user 105 and/or vehicle 110.

For example, the vehicle connection computer 150 can determine a vehicle record based on observed vehicle characteristics 111, and can identify an access credential (e.g., a security code, an access badge number, etc.) stored in the vehicle record. The vehicle connection computer 150 can then provide the access credential to the access gate 540.

In some embodiments, the access gate 540 can store information about access credentials, and the access gate 540 can determine whether to grant access to the physical space 545 based on the access credential. In other embodiments, the access gate 540 can send the access credential to a local access management computer 560 (e.g., a computer that is at or nearby the physical space 545 and access gate 540), which can determine whether or not to grant access and then send a response to the access gate. In further embodiments, an access transaction request message can be forwarded to a remote access management computer 568 (e.g., by the local access management computer 560 and transaction processing computer 164).

In the following sections, methods will be described for a processing payment transaction. However, the methods can also be used for processing an access transaction in order to grant a vehicle 110 access to the physical space 545, or for any other suitable type of vehicle-based transaction.

Figure 6:
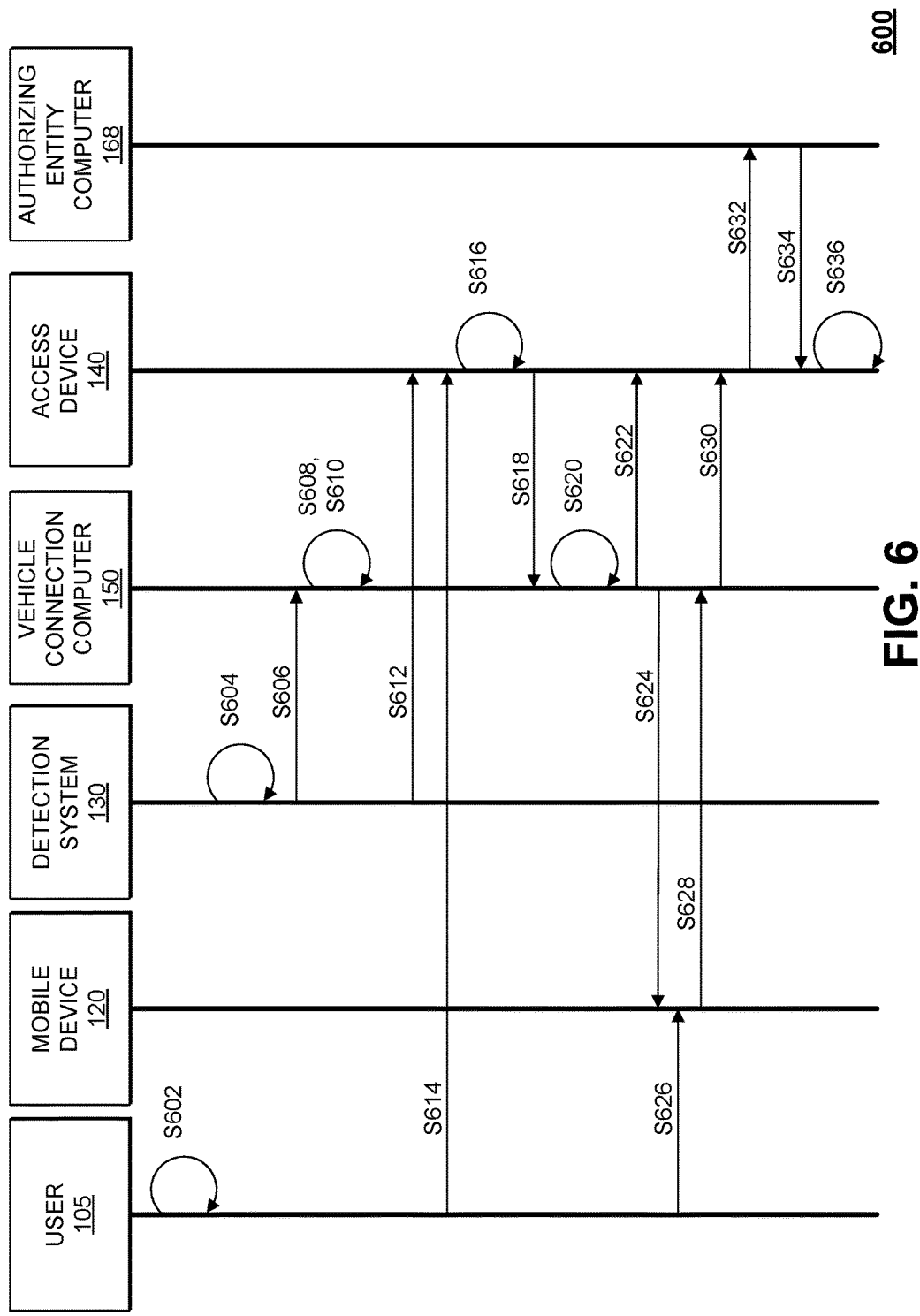
FIG. 6 shows a flow diagram illustrating a first method, according to embodiments of the invention.

A method 600 according to embodiments of the invention can be described with respect to FIG. 6. Some elements in other Figures are also referred to. The steps shown in the method 600 may be performed sequentially or in any suitable order in embodiments of the invention. In some embodiments, one or more of the steps may be optional.

The various messages described below may use any suitable form of communication. In some embodiments, a request or response may be in an electronic message format, such as an e-mail, a short messaging service (SMS) message, a multimedia messaging service (MMS) message, a hypertext transfer protocol (HTTP) request message, a transmission control protocol (TCP) packet, a web form submission. The request or response may be directed to any suitable location, such as an e-mail address, a telephone number, an internet protocol (IP) address, or a uniform resource locator (URL). In some embodiments, a request or response may comprise a mix of different message types, such as both email and SMS messages.

At step S602, the user 105 can drive the vehicle 110 to a merchant transaction area (e.g., a drive-through service area, a gas station, or a highway toll) to obtain goods, services, and/or access. In order to conduct a transaction, the user can cause the vehicle 110 to approach an access device 140 and/or a detection system 130.

At step S604, the detection system 130 can measure and/or observe the vehicle 110. The detection system 130 can use one or more instruments to obtain vehicle information for the vehicle 110. For example, the detection system 130 can capture an image of the vehicle 110, measure the weight of the vehicle 110, and/or obtain a laser scan of the vehicle 110.

At step S606, the detection system 130 can send vehicle information to the vehicle connection computer 150.

At step S608, the vehicle connection computer 150 can determine one or more vehicle characteristics based on the received vehicle information. For example, the vehicle connection computer 150 can identify a license plate number and a color based on an image of the vehicle 110. The vehicle connection computer 150 can also create a 3D digital model of the vehicle 110 based on laser scan, and then identify a vehicle type (e.g., a make, model, and year of manufacture) by comparing the 3D digital model with a stored set of 3D digital models.

At step S610, the vehicle connection computer 150 can identify a vehicle record based on the determined vehicle characteristics. For example, the vehicle connection computer 150 can identify a vehicle record associated with one or more of the same vehicle characteristics. As a result, the vehicle connection computer 150 can uniquely identify the vehicle 110, and the vehicle connection computer 150 can access a credential, identify mobile device 120 contact information, and/or obtain user information associated with the vehicle 110.

At step S612, the detection system 130 may also send the vehicle information to the access device 140. As a result, the access device 140 may be able to communicate with the vehicle connection computer 150 about the vehicle 110.

At step S614, the user 105 may request one or more goods or services for purchase at the merchant. For example, the user 105 may place a food order at a drive-through window. The requested goods and services can be entered (e.g., by merchant service person) into the access device 140. The access device 140 can also calculate a transaction amount based on the selected items. The selected items and the transaction amount can be used as transaction details.

At step S616, the transaction details can be associated with the vehicle information at the access device 140. For example, a service person can enter a license plate number to link with the transaction details. Alternatively, the service person can select the vehicle 110 from among a list of vehicles currently in the service area. The vehicles may be listed by displaying vehicle images on the access device 140, or by listing vehicle characteristics extracted from images. In some embodiments, the vehicle information can be automatically linked with the transaction details because the vehicle 110 is located near a service window, because the vehicle 110 is positioned near the detection system 130 (e.g., in a camera's field of view), and/or because an RFID signal is obtained from a vehicle 110 when it is placing an order.

At step S618, the access device 140 can send the transaction details and/or the vehicle information to the vehicle connection computer 150.

At step S620, the vehicle connection computer 150 can identify the vehicle record based on the vehicle information received from the access device 140. Instead of repeating steps S608 and S610, the vehicle connection computer 150 can match the vehicle information received in S618 to the vehicle information received in step S606, and thereby identify the vehicle record that was already found in step S610. As a result, the vehicle connection computer 150 can associate the current transaction details with the vehicle record.

At step S622, the vehicle connection computer 150 can send the credential and/or other user information from the vehicle record to the access device 140. As a result, the access device 140 can obtain the credential without the user 105 having to physically hand over a payment device.

The access device 140 can use the credential to obtain transaction authorization. However, before seeking authorization from an authorizing entity, the access device 140 may wait for the vehicle connection computer 150 to indicate that the user 105 consents to the transaction.

At step S624, the vehicle connection computer 150 can request transaction approval from the mobile device 120. For example, the vehicle connection computer 150 may send a transaction approval request message to the mobile device 120 including the transaction details received from the access device 140. The transaction approval request message may be sent as an SMS (e.g., text message), an email, a phone call, or any other suitable message. As a result, the user 105 may be able to review the goods and/or services selected, the purchase amount, information about the merchant at which the transaction is being conducted (e.g., a name and/or location), and/or any other suitable information.

At step S626, the user 105 may indicate approval of the transaction. For example, the user 105 can select a link indicating approval or create a reply message.

At step S628, the mobile device 120 may transmit a transaction approval response message back to the vehicle connection computer 150. The transaction approval response message can include some or all of the information included in the transaction approval request message, such that the vehicle connection computer 150 can identify the transaction associated with the message.

At step S630, the vehicle connection computer 150 can inform the access device 140 that the user 105 consents to the transaction. The vehicle connection computer 150 can send a message that includes the transaction details, vehicle information, a transaction identifier, or any other suitable information so that the access device 140 can identify the transaction associated with the message.

At step S632, the access device 140 can proceed to obtain authorization for the transaction. The access device 140 can send an authorization request message including the transaction details, the credential (e.g., and any other suitable payment information), merchant-identifying information (e.g., a merchant ID, merchant name, and merchant location), and any other suitable information.

FIG. 6 shows the authorization request message being sent to the authorizing entity computer 168 at step S632. However, the authorization request message may be routed to the authorizing entity computer 168 through one or more other entities, including the resource provider computer 160, the transport computer 162, and/or the transaction processing computer 164, as shown in FIG. 1.

The authorizing entity computer 168 can authorize the transaction based on the credential and transaction details. For example, the authorizing entity computer 168 can identify a payment account associated with the credential and determine whether the account includes sufficient funds.

At step S634, the authorizing entity computer 168 can send an authorization response message back to the access device 140 (e.g., through one or more other entities). The authorization response message can indicate whether or not the transaction is approved.

At step S636, the access device 140 can display a message indicating whether or not the transaction is approved (e.g., to a service person). The merchant (e.g., a service person) can then release the purchased goods or services to the user 105, and the user 105 may then leave the area by driving the vehicle 110 away.

In some embodiments, one or more of the above-described steps can take place at the same time or in a different order. For example, in some embodiments, step S606 can be omitted, as the vehicle information can also be sent to the vehicle connection computer 150 by the access device 140 at step S618. In this case, steps S608 and S610 can take place after step S618. However, it can be advantageous to keep step S606, as it allows the vehicle connection computer 150 to determine vehicle characteristics and locate the vehicle record in parallel with the user 105 placing the order (e.g., at steps S612-S618). As a result, when the transaction details arrive at the vehicle connection computer 150 at step S618, the vehicle connection computer 150 can immediately proceed to step S622 (e.g., seeking the user's purchase approval), thereby improving efficiency.

Further, in some embodiments, step S622 can be omitted, as the payment credentials can instead be sent to the access device 140 at step S630 (e.g., along with the message indicating the user's approval). However, it can be advantageous to keep step S622, as it allows the access device 140 to generate and prepare the authorization request message (e.g., without sending it) in parallel with obtaining the user's approval (e.g., at steps S624-S628), such that the authorization request message can be sent as soon as possible.

In some embodiments, there may be multiple payment accounts (or other types of credentials) associated with the vehicle record. The user 105 may be able to specify which credentials to use for a given transaction (e.g., via the transaction approval response message).

Additionally, in some embodiments, instead of indicating transaction approval via the mobile device 120 (e.g., by responding to a transaction approval request message), the user 105 can indicate purchase approval via a merchant terminal such as the access device 140. For example, the user 105 can sign a receipt or touchpad, or enter a PIN.

In some embodiments, the transaction can proceed without the user 105 providing real-time approval. For example, instead of requesting the user's approval at step S624, the vehicle connection computer 150 can provide a transaction alert that informs the user 105 about the transaction but does not request a user 105 response. Accordingly, in some embodiments, vehicle-based transactions can be processed automatically in the backend without user 105 involvement.

Figure 7:
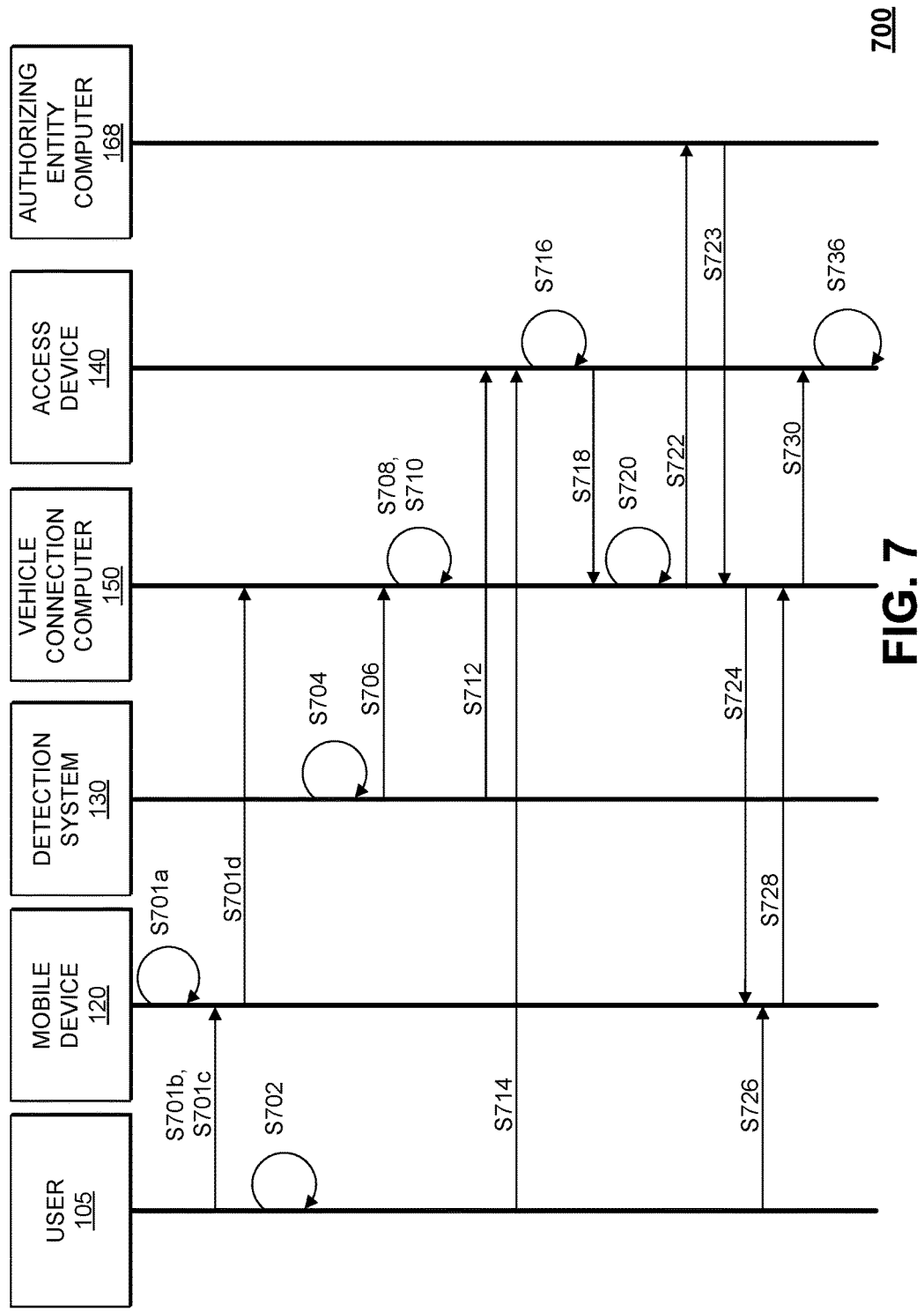
FIG. 7 shows a flow diagram illustrating a second method, according to embodiments of the invention.

A second flow with several alternative steps, according to embodiments of the invention, can be described with respect to FIG. 7.

The method 700 shown in FIG. 7 includes additional initial steps of registering the vehicle 110 with the vehicle-based transaction system. For example, at step S701a, the user 105 can download a mobile application onto the mobile device 120. The mobile application can be configured to facilitate vehicle-based transactions.

At step S701b, the user 105 can use mobile application (or an associated website) to register for vehicle-based transactions. To register, the user 105 can provide payment credentials (e.g., a PAN, a digital wallet identifier, etc.), information associated with the vehicle 110 (e.g., vehicle characteristics), contact information (e.g., a mobile device 120 phone number, and email address, etc.), a driver's license number, and/or any other suitable information. The user 105 can also provide authentication information for logging into the mobile application or otherwise accessing the vehicle record. For example, the user 105 can establish a username and password, a PIN, and/or provide bio-authentication data (e.g., a fingerprint).

At step S701c, the user 105 can set transaction alert policies. For example, the user 105 can specify that the mobile device 120 should be alerted whenever a transaction is attempted, and that the transaction should not be processed unless the user 105 indicates approval. Alternatively, the user 105 may allow all transactions to process automatically, or allow some to process automatically (e.g., if the amount is below a certain threshold, or the transaction is at a certain merchant or location).

At step S701d, the mobile application can cause the mobile device 120 to transmit the registration information to the vehicle connection computer 150. The vehicle connection computer 150 can create a vehicle record based on the received information, such that the vehicle 110 can then be used for transactions (e.g., because the vehicle 110 is linked with payment credentials).

Having activated the mobile application and registered the vehicle 110 for transactions, the user 105 can proceed to use the vehicle 110 for a transaction. FIG. 7 then shows steps S702-S720. In some embodiments, these steps may be the same as or substantially similar to steps S602-S620 in FIG. 6, and the descriptions of those steps are not repeated in the description of FIG. 7.

Then instead of sending the credentials to the access device as in step S622, the vehicle connection computer 150 can process the transaction on behalf of the access device 140. For example, at step S722, the vehicle connection computer 150 can generate and send the authorization request message to the authorizing entity computer 168 on behalf of the merchant. Accordingly, the transaction can be processed without ever having to provide payment credentials to the merchant.

At step S723, the authorizing entity computer 168 can send an authorization response message back to the vehicle connection computer 150 (e.g., through one or more other entities). The authorization response message can indicate whether or not the transaction is approved.

The vehicle connection computer 150 can also obtain user 105 approval for the transaction at steps S724-S728, which in some embodiments can be the same as or similar to steps S624-S628. However, the transaction approval request message can be sent as an in-application message to the mobile application. As a result, the user's indication of approval can be provided in a different manner. For example, at step S726, the user 105 can approve the transaction via the mobile application (e.g., selecting an approval button). Additionally, the user 105 may be asked to self-authenticate before being able to approve the transaction (e.g., by providing authentication information or a fingerprint).

In some embodiments, the user's approval can be obtained before, in parallel with, or after sending the authorization request message in step S722. In some embodiments, the vehicle connection computer 150 may not inform the access device 140 whether the transaction is approved until both the authorization response message and the transaction approval response message are received.

At step S730, the vehicle connection computer 150 can inform the access device 140 that the transaction was authorized by the authorizing entity computer 168 and/or approved by the user 105. In some embodiments, the vehicle connection computer 150 can forward the authorization response message to the access device 140, and this can also indicate that the user 105 consents.

Then, the transaction can be completed, the goods released, and the vehicle 110 can depart at step S736, which can be the same as or similar to step S636.

In some embodiments, instead of the vehicle connection computer 150 receiving the authorization response message and forwarding it the access device 140, the authorization response message can be sent directly to the access device (e.g., by the authorizing entity computer 168, the transaction processing computer 164, the transport computer 162, and/or the resource provider computer 160). For example, the authorizing entity computer 168 can address the authorization response message to a merchant indicated in the authorization request message.

Figure 8:
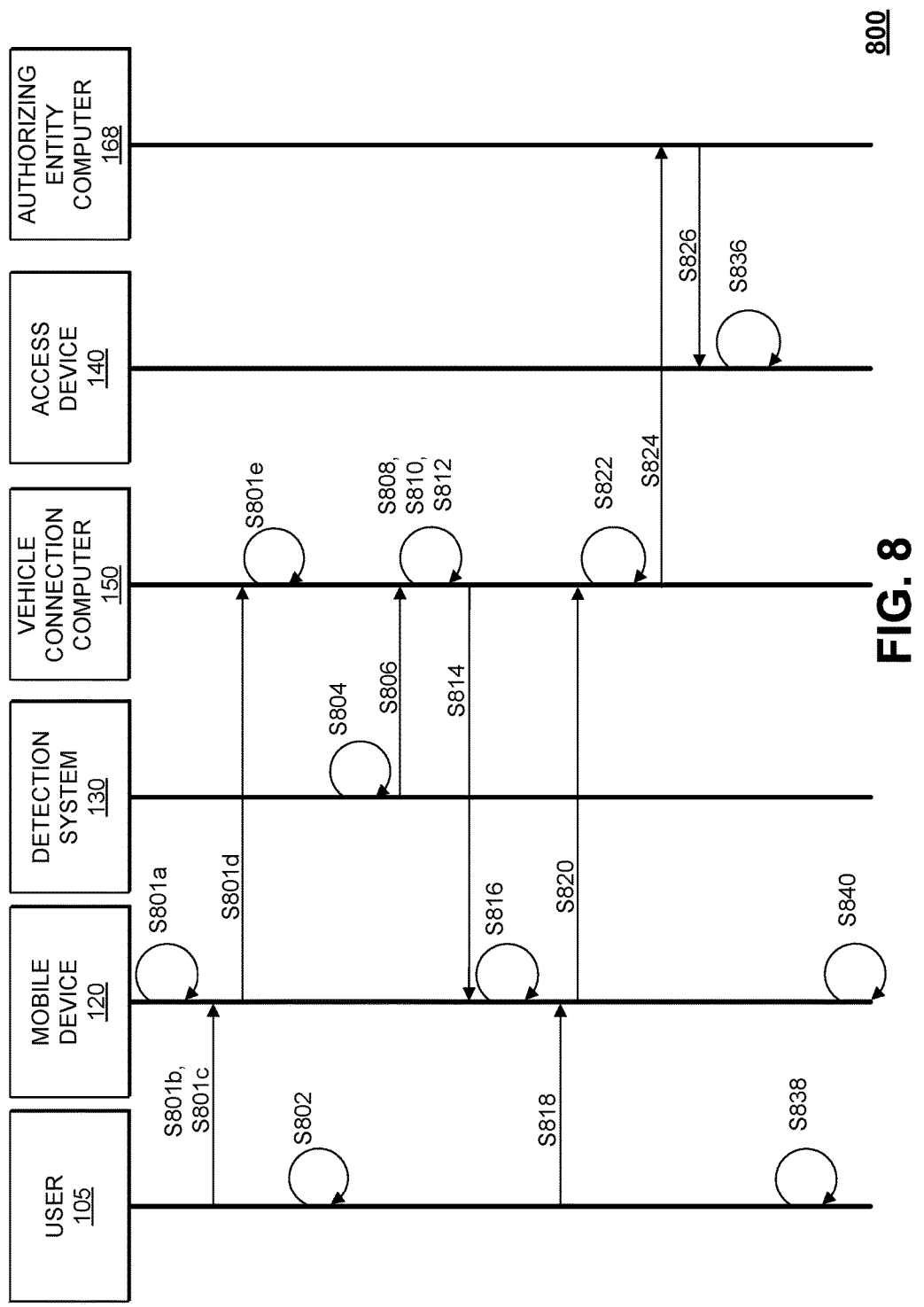
FIG. 8 shows a flow diagram illustrating a third method, according to embodiments of the invention.

A third flow with more alternative steps and functionality, according to embodiments of the invention, can be described with respect to FIG. 8. The method 800 also includes a number of similar to steps that may be the same as or substantially similar to steps described for the methods 600 and 700. For example, the user 105 can download a mobile application and register the vehicle 110 at steps S801a-S801d, which may be the same as or substantially similar to steps S701a-S701d.

The method 800 includes an additional step S801e, at which a merchant (e.g., via a merchant computer or an access device) can register (e.g., create an account) with the vehicle connection computer 150. The merchant can provide a merchant identifier, a contact address, and/or any other suitable information for enabling vehicle-based transactions.

In some embodiments, the merchant can also specify mobile application configurations. For example, when the vehicle 110 arrives at a merchant location, the mobile application on the mobile device 120 may be loaded with a customized display that is specific to that merchant. The appearance of the graphical user interface (e.g., a look and feel), the selectable items (e.g., a menu), and any other suitable characteristic of the application can be adjusted based on the current merchant. The merchant can provide these application interface configurations (and details about other aspects of the user's experience) to vehicle connection computer 150.

FIG. 8 then shows steps S802-S810. In some embodiments, these steps may be the same as or substantially similar to steps S602-S610 in FIG. 6, and the descriptions of those steps are not repeated in the description of FIG. 8.

Then, at step S812, the vehicle connection computer 150 can determine a set of application configurations for use in the current transaction. For example, the vehicle connection computer 150 can identify a merchant record based on a merchant identifier or merchant account number received from the detection system 130 (e.g., along with the vehicle information). The merchant record can include specifications for how to adjust a mobile application, such as a graphical user interface to display, and a menu to display.

Continuing to step S814, having identified the mobile device 120 contact information (e.g., a phone number or application ID) and the application configurations associated with the merchant, the vehicle connection computer 150 can send (e.g., push) the mobile application configurations to the mobile device 120.

At step S816, the mobile device 120 can re-configure the mobile application based on the received application settings. For example, the mobile device 120 can apply received settings and configurations to the mobile application such that the mobile application displays a certain set of information, a certain format, and includes any other specified user interface features. As a result, when the user 105 arrives at the merchant location, the mobile device 120 can automatically provide the user 105 with a merchant-specific interface. The mobile application can maintain this configuration for any suitable amount of time before resetting (e.g., until the user 105 places an order, until the vehicle 110 departs the merchant location, etc.).

At step S818, the user 105 can select one or more items for purchase via the mobile application on the mobile device 120. In some embodiments, the mobile application can (in conjunction with a mobile device 120 processor) determine a transaction amount based on the selected items. The selected items and the transaction amount can be used as transaction details.

At step S820, the mobile application can cause the mobile device 120 to transmit the transaction details to the vehicle connection computer 150.

In some embodiments, steps S812-S820 can create a scenario where one or more of steps S612-S630 can be omitted. For example, the user 105 may not need to request goods or services from a service person (as in step S614), as the user 105 can instead make selections via the mobile device 120. Additionally, the vehicle connection computer 150 may not need to send a transaction approval request message to the mobile device 120 (e.g., as in steps S624-S628) since the user 105 placed the order via the mobile device 120 (e.g., and may have provided authentication information along with the order).

At step S822, the vehicle connection computer 150 can create an association between the received transaction details with the vehicle 110 (e.g., the vehicle record).

At step S824, the vehicle connection computer 150 can generate and send an authorization request message to the authorizing entity computer 168 on behalf of the merchant. In addition to the payment credentials (e.g., from the vehicle record) and transaction amount, complete transaction details can also be included in the authorization request message. For example, specific information about the purchased goods or services can be included, such as product names, item numbers, etc. In some embodiments, the authorization request message can also include information for identifying the vehicle 110 (e.g., vehicle characteristics and/or vehicle information measured by the detection system 130).

In some embodiments, the authorization request message can instead be transmitted to a merchant payment gateway computer, which can process the transaction for the merchant.

In some embodiments, the authorization response message may not need to be sent back to the vehicle connection computer 150, and can instead be sent more directly to the merchant. For example, at step S826, the authorizing entity computer 168 can send an authorization response message to the merchant (e.g., the access device 140) based on a merchant identifier indicated in the authorization request message.

The authorization response message can indicate whether or not the transaction is authorized. In some embodiments, the authorization response can include the transaction details and/or the associated vehicle 110 to the access device 140. Accordingly, the merchant can receive the user's order and/or information for identifying the associated vehicle 110 via the authorization response message.

Then, the transaction can be completed and the goods released at step S836, which can be the same as or similar to step S636.

At step S838, the user 105 can drive the vehicle 110 away from the merchant location. In some embodiments, at step S840, when the vehicle 110 departs the merchant location, the mobile application may reset to a generic or default shell configuration by removing the merchant-specific configurations.

In some embodiments, as described above, the mobile device 120 can be incorporated as a component of the vehicle 110. Accordingly, the application interface may be displayed on an in-vehicle user interface, such as a dashboard console or an on-windshield display. The user 105 may be able to select items for purchase from the in-vehicle user interface instead of through a separate mobile device 120.

In some embodiments, instead of providing transaction details and/or vehicle 110 information to the access device 140 via the authorization response message, the vehicle connection computer 150 can send a separate message with this information directly to the access device 140. Such a message could be sent to the access device 140 at the same time that the authorization request message is sent to the authorizing entity computer 168. As a result, the access device 140 can receive the transaction details before the authorization response message, and may have extra time for preparing the order (e.g., time for cooking and packing a food order).

Further embodiments allow the mobile device 120 to provide payment credentials (e.g., a payment token) to the vehicle connection computer 150 along with the transaction details (e.g., at step S820). As a result, the vehicle connection computer 150 may not need to store the user's credentials in the vehicle record (e.g., because credentials can be obtained from the mobile device 120 for each transaction).

Embodiments of the invention have a number of advantages. For example, in embodiments of the invention user can complete a drive-through purchase without having to provide a payment instrument directly to drive-through service personnel, thereby improving the user's comfort and increasing security by better protecting payment information. Instead, the user's payment information can be retrieved from a remote server computer based on identifying the user's vehicle, and then provided to a merchant's access device. Accordingly, a user's vehicle can effectively serve as a payment instrument without having to store account information locally at the vehicle or at a mobile device.

Additionally, the user can still audit and approve purchases via a mobile device, such that automatic vehicle-based payments are not abused. For example, if a vehicle is stolen or used without permission, the vehicle owner can reject (e.g., via the mobile device) drive-through purchases attempted by the unauthorized vehicle operator.

Embodiments also allow a resource provider to obtain a user's credentials based on a vehicle, and then obtain transaction authorization before granting access or releasing goods. As a result, a vehicle-based transactions can be used in several new settings, such accessing secure areas and making purchases at a drive-through or gas station.

Further, embodiments of the invention allow a user to place an order via mobile device, instead of speaking with a service person. This can advantageously allow the user to view a menu displayed on the mobile device, and minimize the amount of time that the vehicle's windows are open (e.g., so that the user is not exposed to unpleasant weather conditions).

Also, a mobile application can take on a specific settings customized by the merchant (e.g., based on the vehicle's current location). As a result, multiple merchant applications can be integrated into a single mobile application. Accordingly, instead of installing a different application for each merchant, a user can have multiple unique merchant shopping experiences through a single mobile application. This can allow the system architecture to be simplified and made more efficient, as multiple merchant computers and application providers do not all need to communicate directly with multiple user devices. Instead, the merchant computers and application providers can communicate with one central entity (e.g., the vehicle connection computer), as can different user devices. Thus, the vehicle connection computer can serve as a central communication hub and application provider.

A computer system will now be described that may be used to implement any of the entities or components described herein. Subsystems in the computer system are interconnected via a system bus. Additional subsystems include a printer, a keyboard, a fixed disk, and a monitor which can be coupled to a display adapter. Peripherals and input/output (I/O) devices, which can couple to an I/O controller, can be connected to the computer system by any number of means known in the art, such as a serial port. For example, a serial port or external interface can be used to connect the computer apparatus to a wide area network such as the Internet, a mouse input device, or a scanner. The interconnection via system bus allows the central processor to communicate with each subsystem and to control the execution of instructions from system memory or the fixed disk, as well as the exchange of information between subsystems. The system memory and/or the fixed disk may embody a computer-readable medium.

As described, the inventive service may involve implementing one or more functions, processes, operations or method steps. In some embodiments, the functions, processes, operations or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc. In other embodiments, the functions, processes, operations or method steps may be implemented by firmware or a dedicated processor, integrated circuit, etc.

Any of the software components or functions described in this application may be implemented as software code to be executed by a processor using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary.

What is claimed is:

1. A method comprising:
    receiving, by a server computer, vehicle information associated with a vehicle, wherein the vehicle is approaching a merchant access device;
    determining, by the server computer, a vehicle record associated with the vehicle based on the vehicle information;
    identifying, by the server computer, a mobile device associated with the vehicle based on the vehicle record;
    receiving, by the server computer, from the merchant access device, transaction details for a transaction associated with the vehicle;
    sending, by the server computer, a transaction approval request to the mobile device, the transaction approval request including the transaction details;
    receiving, by the server computer, from the mobile device, a transaction approval response indicating that a user consents to the transaction details for the transaction;
    identifying, by the server computer, a credential associated with the vehicle based on the vehicle record; and
    after receiving the transaction approval response from the mobile device, providing, by the server computer, the credential to the merchant access device, wherein the merchant access device sends an authorization request message including the credential to an authorizing entity computer, and wherein the authorizing entity computer authorizes the transaction based on the credential.

2. The method of claim 1, wherein the mobile device is an integrated component of the vehicle.

3. The method of claim 1, further comprising:
    determining, by the server computer, vehicle characteristics based on the vehicle information, and
    wherein determining the vehicle record includes:
        comparing the vehicle characteristics with a plurality of vehicle characteristics associated with a plurality of vehicle records in a database, and identifying a matching set of vehicle characteristics from the plurality of vehicle characteristics.

4. The method of claim 3, wherein the vehicle information was obtained using vehicle detection hardware, the vehicle detection hardware including at least one of a camera and a scale, wherein the vehicle information includes at least one of a picture and a weight, and wherein the vehicle characteristics include at least one of a color, a make, and a model.

5. The method of claim 1, wherein the credential is an access code, wherein the merchant access device is an access gate, wherein the authorized transaction indicates that access is granted, and wherein the vehicle enters a parking garage after the transaction is authorized.

6. The method of claim 1, wherein the merchant access device is a first merchant access device associated with a first merchant, wherein the transaction is a first transaction, wherein the transaction details are first transaction details, wherein the transaction approval request is a first transaction approval request, wherein the transaction approval response is a first transaction approval response, wherein the authorization request message is a first authorization request message, and further comprising:
    receiving, by the server computer, vehicle information associated with the vehicle, wherein the vehicle is approaching a second merchant access device, wherein the second merchant access device is associated with a second merchant, the second merchant being not associated with the first merchant;
    determining, by the server computer, the vehicle record associated with the vehicle based on the vehicle information;
    identifying, by the server computer, the mobile device associated with the vehicle based on the vehicle record;
    receiving, by the server computer, from the second merchant access device, second transaction details for a second transaction associated with the vehicle;
    sending, by the server computer, a second transaction approval request to the mobile device, the second transaction approval request including the second transaction details;
    receiving, by the server computer, from the mobile device, a second transaction approval response indicating that the user consents to the second transaction details for the second transaction;
    identifying, by the server computer, the credential associated with the vehicle based on the vehicle record; and
    after receiving the second transaction approval response from the mobile device, providing, by the server computer, the credential to the second merchant access device, wherein the second merchant access device sends a second authorization request message including the credential to the authorizing entity computer, and wherein the authorizing entity computer authorizes the second transaction based on the credential.

7. A server computer comprising:
    a processor; and
    a computer readable medium, the computer readable medium comprising code, executable by the processor, for implementing a method comprising:
    receiving vehicle information associated with a vehicle, wherein the vehicle is approaching a merchant access device;
    determining a vehicle record associated with the vehicle based on the vehicle information;
    identifying a mobile device associated with the vehicle based on the vehicle record;
    receiving, from the merchant access device, transaction details for a transaction associated with the vehicle;
    sending a transaction approval request to the mobile device, the transaction approval request including the transaction details;
    receiving, from the mobile device, a transaction approval response indicating that a user consents to the transaction details for the transaction;
    identifying a credential associated with the vehicle based on the vehicle record; and
    after receiving the transaction approval response from the mobile device, providing the credential to the merchant access device, wherein the merchant access device sends an authorization request message including the credential to an authorizing entity computer, and wherein the authorizing entity computer authorizes the transaction based on the credential.

8. The server computer of claim 7, wherein the mobile device is an integrated component of the vehicle.

9. The server computer of claim 7, further comprising:
    determining vehicle characteristics based on the vehicle information, and
    wherein determining the vehicle record includes:
        comparing the vehicle characteristics with a plurality of vehicle characteristics associated with a plurality of vehicle records in a database, and
        identifying a matching set of vehicle characteristics from the plurality of vehicle characteristics.

10. The server computer of claim 9, wherein the vehicle information was obtained using vehicle detection hardware, the vehicle detection hardware including at least one of a camera and a scale, wherein the vehicle information includes at least one of a picture and a weight, and wherein the vehicle characteristics include at least one of a color, a make, and a model.

11. The server computer of claim 7, wherein the credential is an access code, wherein the merchant access device is an access gate, wherein the authorized transaction indicates that access is granted, and wherein the vehicle enters a parking garage after the transaction is authorized.

12. A method comprising:
    receiving, by a server computer, from a vehicle detection system at a merchant location associated with a merchant, vehicle information associated with a vehicle, wherein the vehicle is approaching a merchant access device associated with the merchant;
    determining, by the server computer, a vehicle record associated with the vehicle based on the vehicle information;
    identifying, by the server computer, a mobile device associated with the vehicle based on the vehicle record;
    determining, by the server computer, a merchant record associated with the merchant;
    identifying, by the server computer, application settings associated with the merchant record; and
    transmitting, by the server computer, the application settings to the mobile device, wherein the mobile device applies the application settings to a mobile application, wherein a user selects transaction details via the mobile application for a transaction; and
    receiving, by the server computer, a transaction request from the mobile device, the transaction request including the transaction details for the transaction, wherein an authorization request message including at least some of the transaction details is sent to an authorizing entity computer, and wherein the authorizing entity computer authorizes the transaction.

13. The method of claim 12, further comprising:
identifying, by the server computer, an access code associated with the vehicle based on the vehicle record, wherein the authorization request message includes the access code, wherein the merchant access device is an access gate, wherein the authorized transaction indicates that access is granted, and wherein the vehicle enters a parking garage after the transaction is authorized.

14. The method of claim 12, wherein the application settings include a merchant name.

15. The method of claim 12, wherein the application settings include a merchant-specific graphical user interface.

16. The method of claim 12, wherein the application settings include a merchant-specific menu, and wherein the transaction details are selected from the merchant-specific menu.

17. The method of claim 12, wherein applying the application settings to the mobile application changes a look and feel of the mobile application.

18. The method of claim 12, wherein applying the application settings to the mobile application changes a functionality of the mobile application.

19. The method of claim 12, further comprising:
sending, by the server computer, the authorization request message to the authorizing entity computer on behalf of the merchant access device.

20. The method of claim 12, wherein the authorizing entity computer sends an authorization response message to the merchant access device indicating that the transaction is authorized.

21. The method of claim 20, wherein the transaction details are provided to the merchant access device via the authorization response message.

* * * * *